(12) United States Patent
Thompson et al.

(10) Patent No.: US 8,489,831 B2
(45) Date of Patent: Jul. 16, 2013

(54) SYSTEMS AND METHODS FOR DATA SNAPSHOT REPLICATION USING A TOKEN IN A REPLICATION LINK

(75) Inventors: Robert D. Thompson, Loveland, CO (US); Gary L. Thunquest, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 12/243,193

(22) Filed: Oct. 1, 2008

(65) Prior Publication Data

US 2010/0082921 A1    Apr. 1, 2010

(51) Int. Cl.
 *G06F 12/16* (2006.01)
 *G06F 13/00* (2006.01)
(52) U.S. Cl.
 USPC ........................................................ 711/162

(58) Field of Classification Search
 USPC ................................................. 711/161, 162
 See application file for complete search history.

(56) References Cited

U.S. PATENT DOCUMENTS

| | | | | |
|---|---|---|---|---|
| 6,779,093 | B1 * | 8/2004 | Gupta ........................... | 711/162 |
| 7,139,887 | B2 * | 11/2006 | Colgrove et al. ............ | 711/162 |
| 7,149,859 | B2 * | 12/2006 | Fujibayashi .................. | 711/162 |
| 2005/0028026 | A1 * | 2/2005 | Shirley et al. ..................... | 714/6 |

* cited by examiner

*Primary Examiner* — Sanjiv Shah
*Assistant Examiner* — Glenn Gossage

(57) ABSTRACT

Systems and methods for data snapshot replication are disclosed. In an exemplary implementation, a method for data snapshot replication may include inserting a token into a replication link when a data snapshot is generated at a source. The token may be inserted into the replication link while input/output (I/O) operations are quiesced. The method may also include generating the data snapshot on a target in an order that the token is received. This enables systems which are replicating data to also replicate or duplicate snapshots without transferring additional data or re-transmitting the data in the snapshot.

16 Claims, 5 Drawing Sheets

SYSTEMS AND METHODS FOR DATA SNAPSHOT REPLICATION USING A TOKEN IN A REPLICATION LINK

CROSS REFERENCE TO RELATED APPLICATIONS

This Application claims the benefit of provisional patent application Ser. No. 61/057,318 titled "Systems and Methods for Data Snapshot Replication".

BACKGROUND

It is commonplace in computer storage products to create multiple "snapshots" of the stored data. Snapshots are point-in-time representations of the data that is stored on a storage device. It is also commonplace that data sets are replicated to another storage device for disaster recovery, backup, etc. There are various ways to replicate the data using hardware, software, or a combination of both.

While it is common to duplicate data from one computer system to another, it is less common to replicate snapshots of the data from one computer system to another due to data set size or other factors. This is particularly problematic when replication is performed over a relatively slow network connection, such as a wide area network (WAN).

Instead, expensive hardware solutions may be implemented, such as, e.g., Fibre Channel (FC) transaction mirroring, dedicated storage area network (SAN) traffic mirroring, dedicated storage system hardware, etc. Some hardware systems perform duplicate write operations on two sets of storage arrays before acknowledging back to the computer that the file operation has completed. FC solutions utilize dedicated hardware to duplicate the input/output (I/O) traffic on two or more separate SANs to duplicate the data I/O. Software solutions may also be implemented for replicating the entire contents of snapshots, but do not replicate the snapshot space and bandwidth efficiently to the replication target with respect to the replicated base image.

DETAILED DESCRIPTION

Systems and methods for data snapshot replication are disclosed. Exemplary systems and methods enable at least two systems which are replicating data to also replicate (e.g., duplicate) snapshots without transferring additional data beyond what is already being transmitted. Transmitting a snapshot (a point-in-time event) rather than re-transmitting the data in the snapshot eliminates the need for additional data to be transmitted while enabling a snapshot which is identical to what is created on the source system to be created on the replica target system. This approach is useful in the creation of application-consistent snapshots in multiple locations that may be connected with very slow (e.g., WAN) connections.

Slow (limited bandwidth) networks practically prohibit the replication of large amounts of data, and thus make replicating frequent snapshots impractical for large amounts of data. Replicating data and the snapshots would require the retransmission of the data for each snapshot. According to exemplary embodiments described herein, replicating the snapshot (point-in-time event), which requires only a few bytes of information to be placed in the data stream (i.e., the data stream that already exists to replicate the data) instead of retransmitting the snapshot data makes replicating snapshots much less consumptive of the network resources, and makes replicating snapshots over slow networks now feasible.

Figure 1:
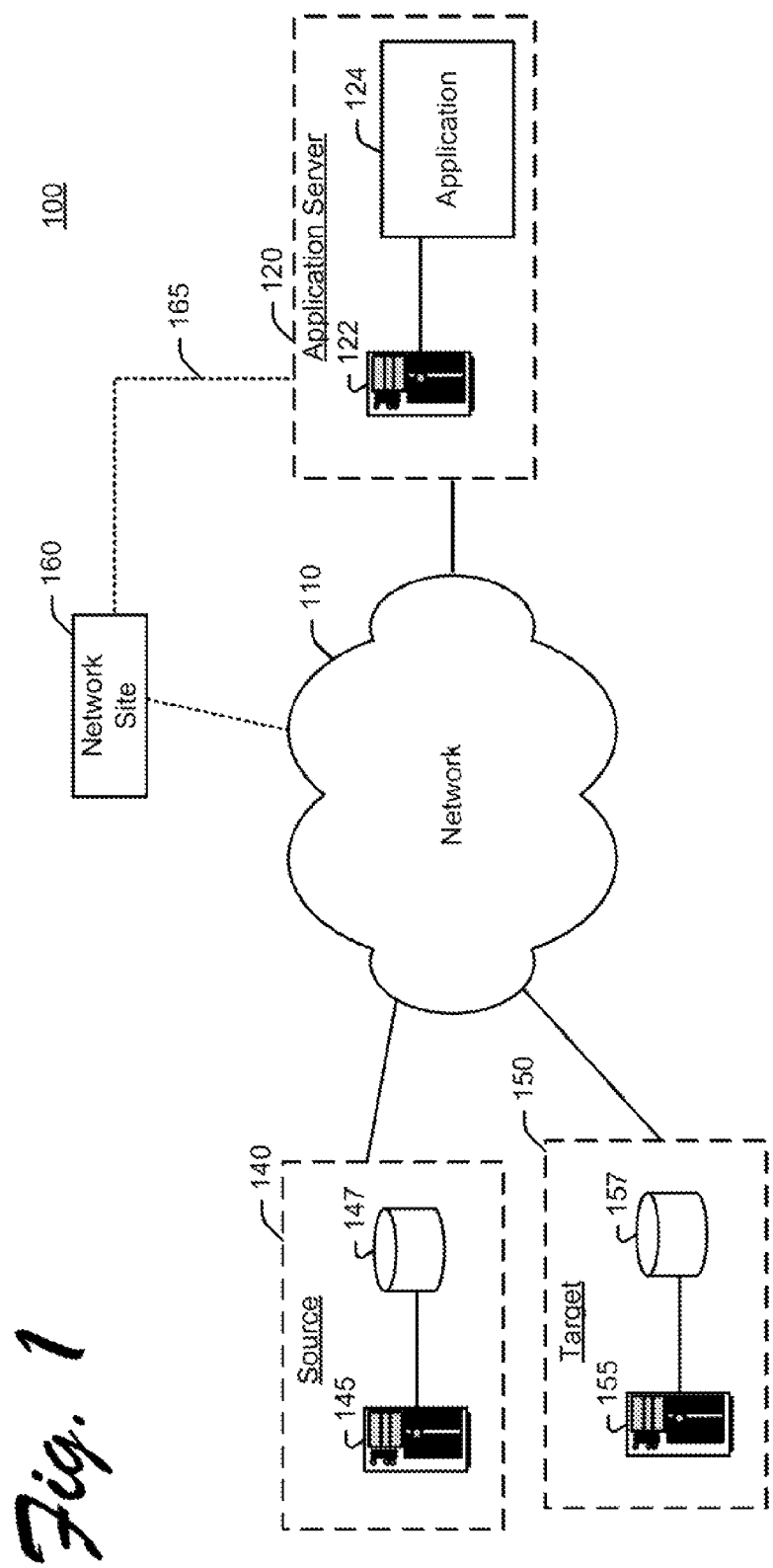
FIG. 1 is a high-level illustration of an exemplary networked computer system which may be implemented for data snapshot replication.

FIG. 1 is a high-level illustration of an exemplary networked computer system 100 which may be implemented for data snapshot replication. The networked computer system 100 may include one or more communication networks I/O, such as a wide area network (WAN). An application server 120 may be implemented in the networked computer system 100. Application server 120 may be communicatively coupled to a source storage device 140 and a target storage device 150.

Application server 120 may include one or more computing systems, such as a server 122 executing a data management application 124 implemented in software and stored on computer-readable storage. Application server 120 may also provide services to other computing or data processing systems or devices. For example, application server 120 may also provide transaction processing services, email services, etc.

Application server 120 may be provided on the network I/O via a communication connection, such as a dial-up, cable, or digital subscriber line (DSL) connection via an Internet service provider (ISP). Application server 120 may access source storage 140 and target storage 150 directly via the network I/O. In an exemplary embodiment, network site 160 may also include a web portal on a third-party venue (e.g., a commercial Internet site), which facilitates a connection for one or more clients with application server 120 (e.g., via back-end link 165). By way of example, application 124 may be a structured query language (SQL) server and network site 160 may be a web hosting company that uses application server 120 for database needs but also directly accesses the storage 140, 150.

Source storage 140 and target storage 150 may include any of a wide variety of computer storage systems. Typically the storage systems are implemented as one or more storage servers 145, 155, and one or more storage devices 147, 157. Regardless of the particular implementation, however, source storage 140 and target storage 150 may include memory, storage, and a degree of data processing capability at least sufficient to manage a connection to the application server 120 either directly via network I/O or indirectly (e.g., via network site 160). The source storage 140 and target storage 150 may also connect to network I/O via a communication connection, such as a dial-up, cable, or DSL connection via an Internet service provider (ISP).

It is noted that the systems and methods described herein are not limited to any particular implementation, and the implementation shown in FIG. 1 is merely exemplary for purposes of illustrating one such system which may be used for data snapshot replication. For example, there may be multiple source/target storage. The application server and source/target storage may be co-located or physically separate from one another. Still other environments which may implement data snapshot replication will also be readily apparent to those having ordinary skill in the art after becoming familiar with the teachings herein.

Data backup programs typically create data snapshots in order to backup a system without concern for data that is open or otherwise in use. These data snapshots (or simply "snapshots") are typically temporary and only exist while the backup operation is being performed. Replicating these temporary snapshots is useful in enabling the movement of the backup program to the replica storage, rather than requiring it to run on the source or primary storage. So, replicated snapshots may be used to perform backups on the target storage device without burdening the source storage device. Replicated snapshots may also be used for disaster recovery. In disaster recovery, snapshots may be used to recover a consistent set of data at the source storage device that has been replicated to and saved on the target storage device.

Other exemplary uses for data snapshots may include, but are not limited to, data mining, development and debugging. In each of these examples, the source or production system is not burdened with the operation itself (e.g., data mining). In other words, a production transaction database that handles credit card transactions does not need to be burdened (thereby slowing the transaction processing) with data mining against that same database. That is, it is beneficial to do the data mining using a replicated database.

Figure 2:
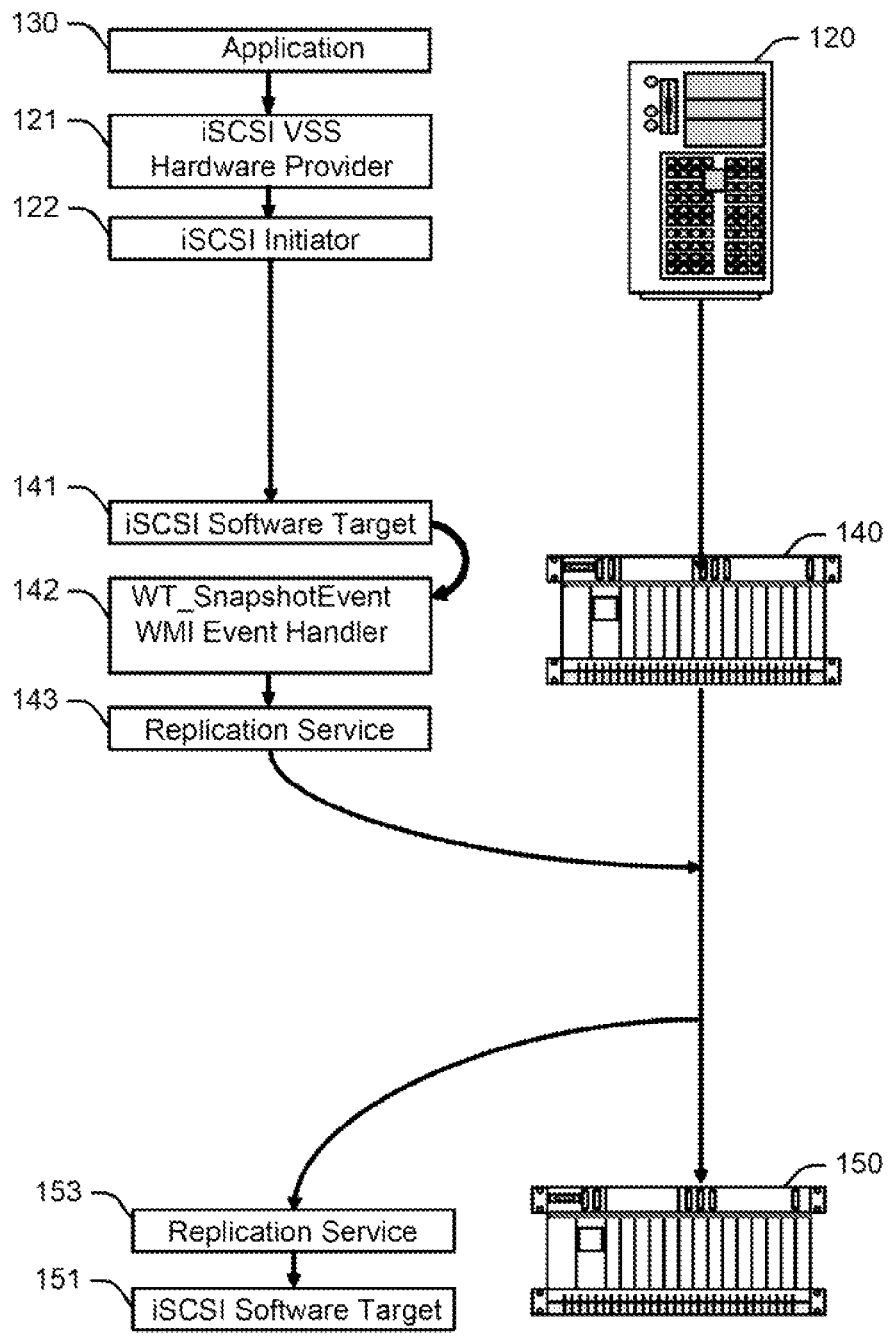
FIG. 2 is an illustration of exemplary data management operations being performed on an application server and storage servers.

FIG. 2 is an illustration of exemplary data management operations being performed on an application server (e.g., the application server 120 shown in FIG. 1) and storage servers. In this illustration, the application server 120 utilizes an Internet Small Computer System Interface (iSCSI) logical unit number (LUN) to host its storage.

It is understood in the computer arts that iSCSI is a protocol which enables a computer system to send SCSI commands to target storage devices over an Ethernet network. iSCSI can be used over long distances with existing network infrastructure. A storage device may include multiple physical SCSI ports, each being assigned a different target address. The storage device may be partitioned into separate storage volumes, each represented by a LUN.

A data management application 130 executing on the application server 120 may utilize an iSCSI LUN to host its storage. In this example, an iSCSI initiator 122 may be installed on the application server 120 along with the iSCSI volume shadow copy service (VSS) hardware provider 121. An iSCSI software target 141 is installed on a storage server (e.g., source 140). The iSCSI software target 141 (WT Snapshot) provides iSCSI protocol serving to the iSCSI initiator 122 on the application server 120. The source 140 also maintains a WT Snapshot Event WMI (Windows Management Instrumentation) event handler 142, to handle a Snapshot creation Event from the iSCSI software target 141. The term "WT Snapshot" is a class in MICROSOFT® WINDOWS® and is used to represent a volume shadow copy. The WT Snapshot class has "methods" and "properties" members. Replication service 143 may also be installed on the source 140 and configured to replicate written data to another storage server (e.g., target 150). Target 150 may also be executing an instance of the iSCSI software target 151 and replication service 153.

The system for replicating data snapshots may implement a mechanism for notifying processes that rely on the status of the iSCSI target snapshots. The system may also include a mechanism for creating the snapshots on both the source and target servers. The system may also include a mechanism to replicate data from the source 140 to the target 150.

In the exemplary embodiment shown in FIG. 2, these mechanisms are provided by using MICROSOFT® iSCSI Software Initiator, MICROSOFT® iSCSI Software Target, StorageWorks Storage Mirroring, WMI event handlers, and a MICROSOFT® iSCSI VSS Hardware Provider. However, it will be readily appreciated by those having ordinary skill in the art after becoming familiar with the teachings herein that other implementations may also be provided.

Exemplary operations for implementing data snapshot replication will now be described in more, detail below with reference to the illustrations shown in FIGS. 3-5.

Figure 3:
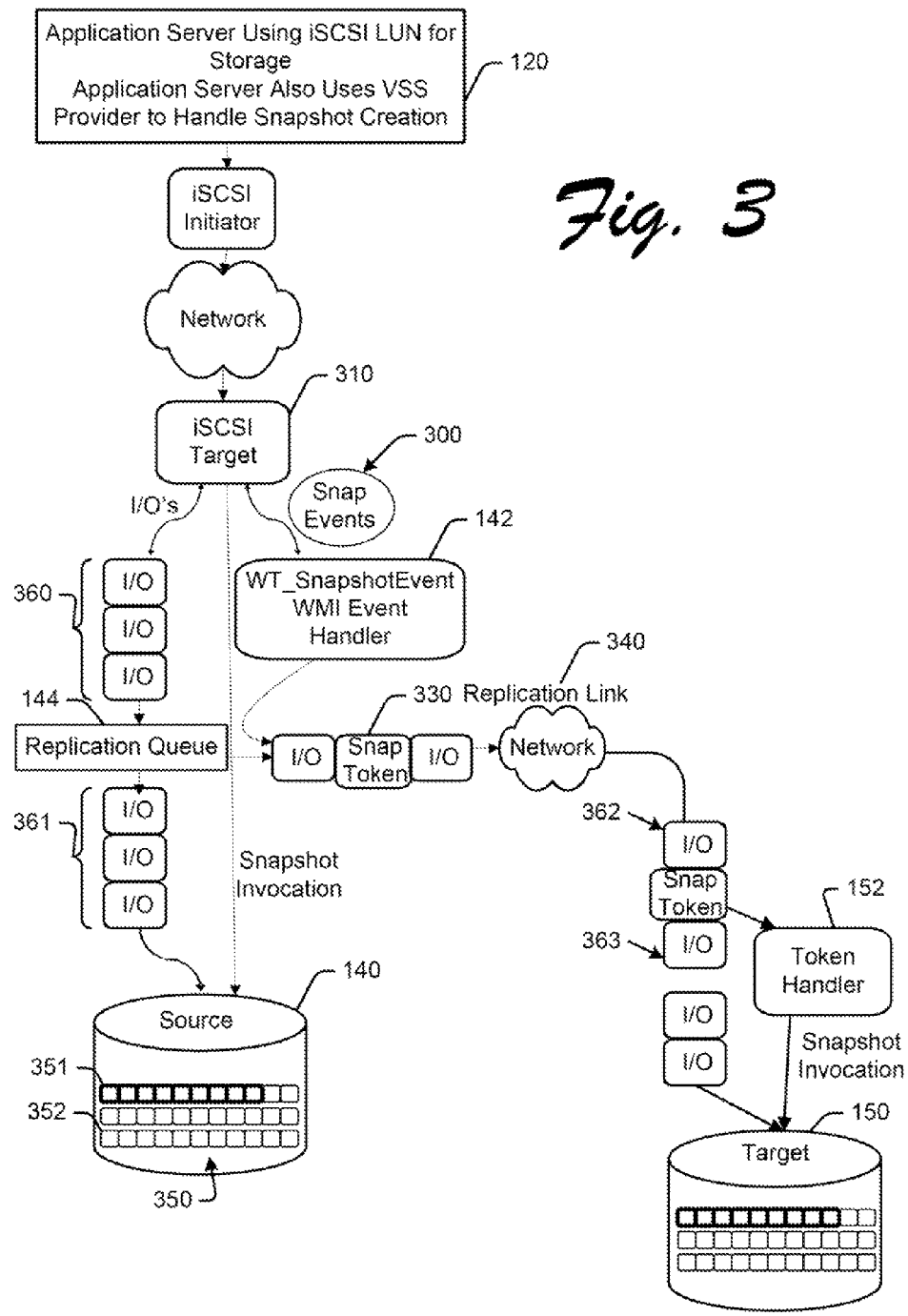
FIG. 3 illustrates an example of data snapshot replication.

FIG. 3 illustrates an example of data snapshot replication. In this example, a snapshot is initiated on the application server 120 and the application's operations are quiesced from the application all the way through to the iSCSI target 310. An iSCSI target 310 then initiates the snapshot and generates an event 300 to "snap event") for the event handler 142 indicating that the snapshot data is frozen in the state captured by the snapshot event. A token 330 indicating that a snapshot should be taken on the target 150 is inserted into a replication link 340. The iSCSI target 310 resumes normal operation as does the application server 120.

Before continuing, it is noted that source 140 is shown in FIG. 3 including blocks 350 used to represent data written to the storage subsystem. The highlighted blocks 351 represent data 361 already written to the subsystem (e.g., at time $T_0$). The non-highlighted blocks 352 represent areas on the storage subsystem that are available for I/O operations 360 (so-called "free space").

The replication link 340 is a medium for transferring the I/O operations 360 from the source 140 to the target 150. The replication link 340 may be a First-In, First-Out (FIFO) construct. An example is a protocol that utilizes Internet Protocol (IP) as a transport over Ethernet. The protocols may include the functionality to send a token 330 from the source 140 to the target 150 that causes an action to be taken at the target 150 that is synchronous to the I/O operations 360. That is, the action is taken in-band with the I/O operations 360 and 361. If an I/O operation 361 is transmitted through the replication link 340 followed by the token 330 and again followed by another I/O operation 360, the first I/O operation 361 is completed then the action represented by the token 330 is taken and then the second I/O operation 360 is performed. The second I/O operation 360 is not performed unless the action indicated by the token 330 is completed.

In operation, a snapshot is created in replication queue 144 and the token 330 is inserted into the replication link 340 at time T. After the token 330 is received by the target 150, the pending I/O operations 363 (ahead of the token 330) are performed, and then the snapshot is invoked and created on the target 150 by snapshot token handler 152. After the snapshot is created, 170 operations 362 continue as before. The snapshot represents the state of the storage when the token 330 is inserted into the replication link 340.

In order to replicate a snapshot created on the source 140, it is important to know what point in time the snapshot is taken with respect to the I/O operations 360. Various mechanisms exist that address this issue. In general it is the responsibility of the application generating the I/O operations 360 to stop briefly while the snapshot is created or generated. During the time when the I/O operations 360 are quiesced, the token 330 can be placed into the replication link 340. It is also important that the token 330 is placed into the replication link 340 after the I/O operations 361 are inserted into the replication link 340 and before I/O operations 360.

After the network link propagation delay, the target 150 receives the I/O operations that have been placed in the replication link 340. The I/O operations are performed on the target 150, and when the token 330 is received, the action that is represented by the token 330 is performed. For snapshots, the token 330 indicates that a snapshot be taken at the target 150. Since the I/O operations 360, 361 may be performed synchronously with the token 330, there is no need to quiesce the data before the snapshot is taken. Specifically, the next I/O operation 360 following the token 330 will not be performed until the snapshot is completed.

It is noted that the snapshots need not be taken at the same time on the source 140 and target 150, but the snapshots do contain the same data. More precisely, the snapshots represent the same state of the storage with respect to the I/O operations 361. The equivalence is ensured by the FIFO behavior of the replication link 340, including passing the token 330.

Figure 4:
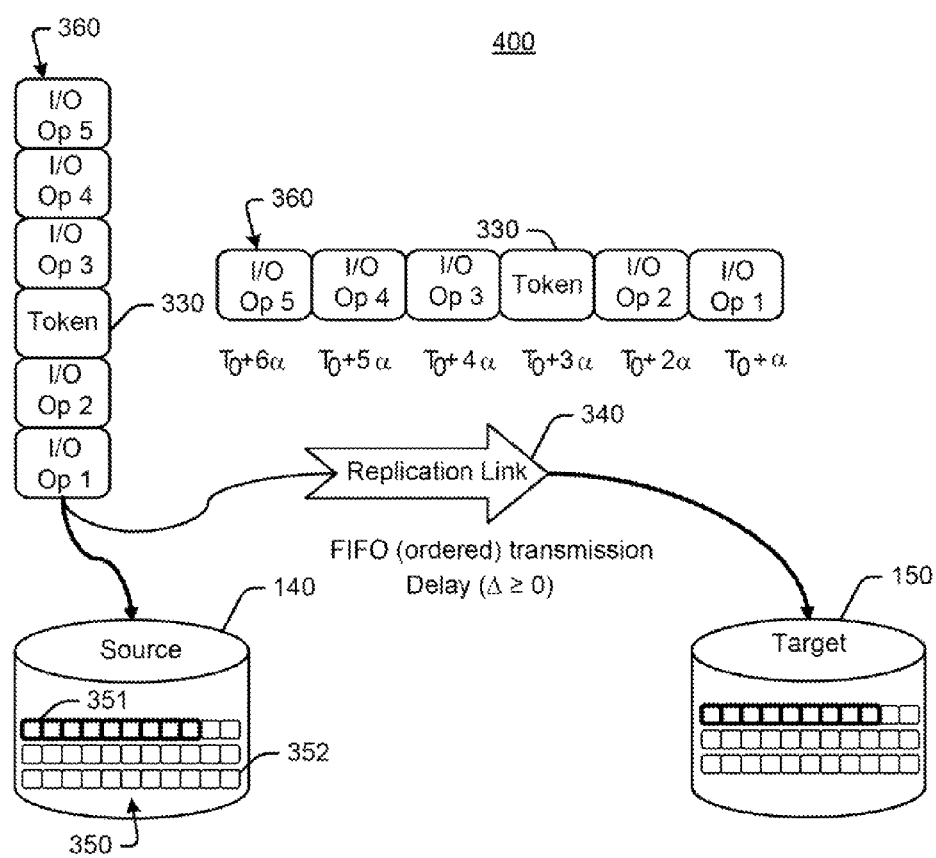
FIG. 4 is an operational timeline illustrating exemplary data snapshot replication.

FIG. 4 is an operational timeline 400 illustrating exemplary data snapshot replication. For purposes of this illustration, the time between I/O operations is the same ($\alpha$). In practice, however, the time between operations need not be a fixed value. I/O operations are composed of reads, writes, combinations of reads and writes, status operations, etc., each of which may take different amounts of time. It is noted, however, that only write operations are replicated across the replication link (not reads, status, or other operations).

At Time=$T_0$, both the source 140 and target 150 may have identical contents, e.g., as if no I/O operations 360 are pending and the systems are at a steady state. At Time=$T_0+\alpha$, a first I/O operation (I/O Op 1) is performed at the source 140 and is replicated through the replication link 340 to the target 150. The I/O operation is then performed at the target 150. At Time=$T_0+2\alpha$, a second I/O operation (I/O Op 2) is performed on the source 140, and is replicated through the replication link 340 to the target 150. The I/O operation is then performed on the target 150.

At Time=$T_0+3\alpha$ a token 330 is inserted into the replication link 340, and the token 330 is transmitted to the target 150. When the target 150 receives the token 330, the action indicated by the token 330 is executed. It is noted that the act of inserting the token 330 into the replication link 340 may (or may not) be the result of an operation on the source 140. In addition, the insertion of the token 330 into the replication link 340 may (or may not) cause an operation on the source 140.

At Time=$T_0+4\alpha$, a third I/O operation (I/O Op 3) is performed on the source 140 and is replicated through the replication link 340 to the target 150. The I/O operation is then performed on the target 150. At Time=$T_0+5\alpha$, a fourth I/O operation (I/O Op 4) is performed on the source 140 and is replicated through the replication link 340 to the target 150. The I/O operation is then performed on the target 150. At Time=$T_0+6\alpha$, a fifth I/O operation (I/O Op 5) is performed on the source 140 and is replicated through the replication link 340 to the target 150. The I/O operation is then performed on the target 150.

As noted above with reference to FIG. 2, the I/O operation 360 at time $T_0+4\alpha$ is not performed on the target 150 until the action indicated by the token 330 is taken on the target 150. This FIFO behavior ensures that the I/O operations that were completed on the source 140 are also completed on the target 150 before the action indicated by the token 330 is taken.

It is noted that the token 330 may be used to indicate any of a wide variety of actions. One example is to use the token 330 to indicate to the target 150 that a snapshot should be taken of the replicated data.

Figure 5:
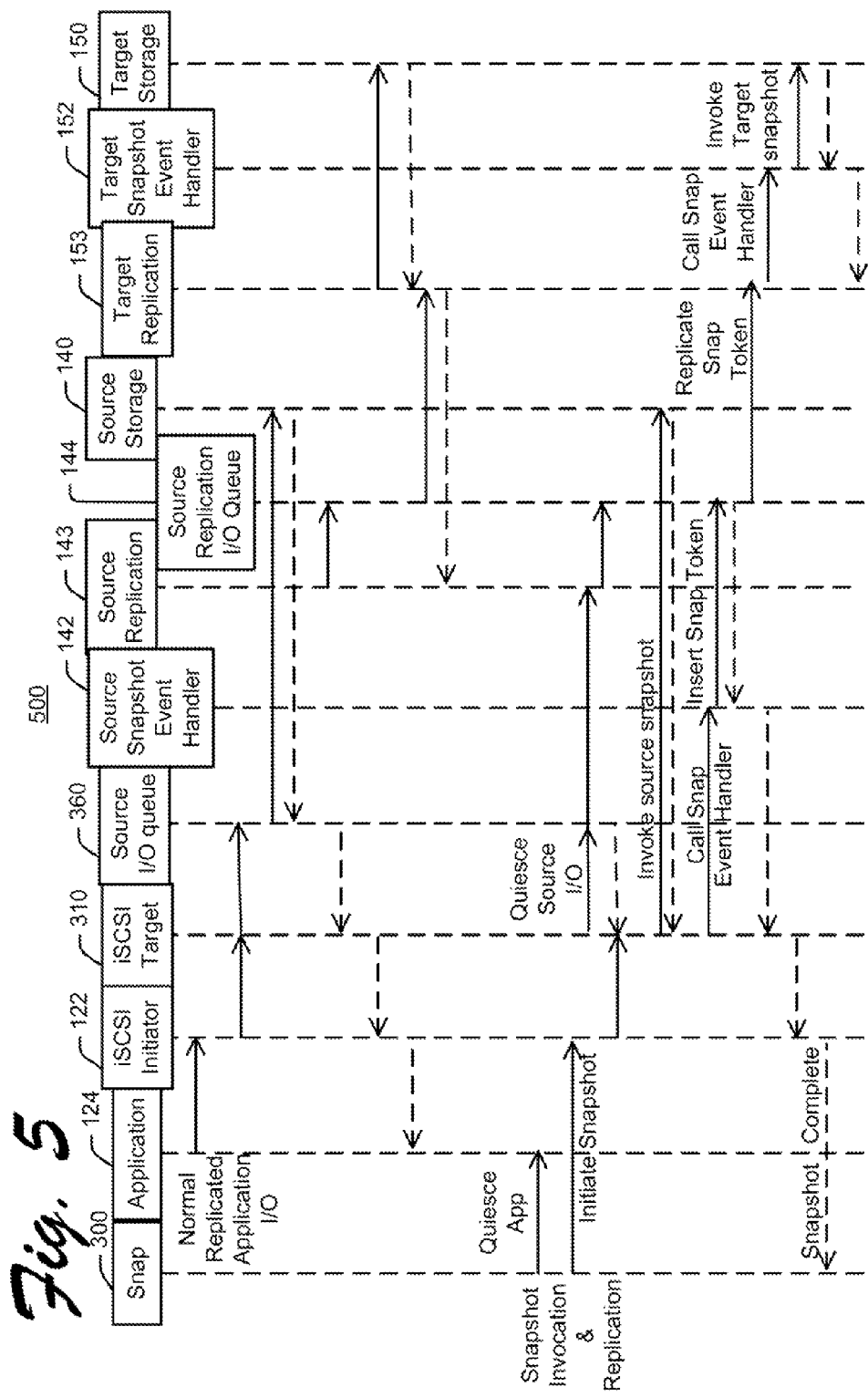
FIG. 5 is a process flow diagram illustrating exemplary operations which may be implemented for data snapshot replication.

FIG. 5 is a process flow diagram illustrating exemplary operations 500 which may be implemented for data snapshot replication. The operations 500 may be embodied as logic instructions on one or more computer-readable media. When executed on a processor, the logic instructions cause a general purpose computing device to be programmed as a special-purpose machine that implements the described operations 500. In an exemplary implementation, the components and connections depicted in the figures may be used for data snapshot replication.

In general, data snapshots may be replicated between two computer systems asynchronously. When data is transferred asynchronously, it is understood that the data an application is creating is saved to one computer system and that in some indeterminate time in the future, the data will be copied to another computer system. One system writes data to a disk subsystem that is being replicated (to another system) and occasionally takes a snapshot of that data. When the storage subsystem takes the snapshot an event is generated and in turn responded to. The event in turn causes a message to be sent to the target of the replication. The replication target interprets that message and creates a snapshot of the replicated data. The message is sent in-band with the replicated data. That is to say that when the snapshot is created at the source (where data is being replicated), all of the data up until the point in time where the snapshot is created has either been replicated or has been queued to be replicated. The message is then placed at the end of that queue.

At the target, all of the data in the snapshot from the source has been received or will be received and written to the local storage subsystem. When the message is received at the target, all of the source data has also been received at the target. A snapshot is then created on the target server so that the contents of the snapshot at the target match the contents of the snapshot at the source.

The snapshot mechanism is designed such that disk I/O is held off (e.g. the I/O is quiesced) when the snapshot is being created and also until the event that indicates a snapshot has been created is handled. A timeout mechanism prevents a race condition that may otherwise prevent further I/O. The act of inserting the message into the replication data stream takes little time and is all that is needed to initiate or trigger a snapshot at the target.

In an exemplary embodiment, an application server 120 may be executing an application 124 that complies with the MICROSOFT® VSS specification inasmuch as it is aware of VSS events and responds to them appropriately. For example, a MICROSOFT® Exchange or MICROSOFT® SQL Server may be implemented. The application server 120 may be used for normal I/O operations and backup operations. A snapshot of the storage presented by the iSCSI initiator/target is initiated on the application server 120. The snapshot operation, through the VSS infrastructure, notifies the application that a snapshot is about to take place, and the application quiesces its I/O operations. When the application has quiesced, the iSCSI initiator informs the iSCSI target that it is ready to take a snapshot of the iSCSI device on the source. By way of a WMI event, the creation of the snapshot is signaled to an event handler.

The event handler inserts a command in the source replication queue. The command tells the target 150 to take a snapshot. The command is placed in the replication traffic stream in band with the replicated data. In other words, the command is placed in the data stream after the data that is in the snapshot has been placed in the stream. The target 150 receives the replication data and writes it to its storage subsystem.

The command is received by the target and the software invokes the command. It is noted that the command should be complete or timeout before replication continues. The command creates a snapshot through the instance of the MICROSOFT® iSCSI Software Target on the target.

By creating a snapshot through the target 150, an application consistent snapshot is made. Thus, if the application server 120 needs the snapshot, it is possible to use it directly without having to resort to extracting files, logs, or other data from the snapshot.

The operations shown and described with reference to FIG. 5 are provided to illustrate exemplary implementations of data snapshot replication in a particular system. It is noted, however, that the operations are not limited to those shown, nor are the operations limited to the ordering shown. Still other operations may also be implemented.

It is noted that the exemplary embodiments of systems and methods shown and described are provided for purposes of illustration and are not intended to be limiting. Still other embodiments are also contemplated for data snapshot replication.

The invention claimed is:

1. A method for data snapshot replication, comprising:
    quiescing Input/Output (I/O) operations at an application server from an application through to an iSCSI target, while a first data snapshot is generated at a source connected to the application server, the I/O operations resuming once the first data snapshot is generated;
    inserting a token into a replication link at a corresponding point in time in a replicated I/O stream after the first data snapshot is generated at the source connected to the application server;
    passing the token from the replication link to a target according to the corresponding point in time in the replicated I/O stream to generate a second data snapshot on the target as the replicated I/O stream is being applied to the target.

2. The method of claim 1, wherein the token is inserted into the replication link while I/O operations are quiesced at the application server.

3. The method of claim 1, wherein the token is inserted into the replication link after some I/O operations have already been inserted into the replication link.

4. The method of claim 1, wherein the token is received at the target after a delay.

5. The method of claim 1, further comprising completing I/O operations following the token only after the second data snapshot at the target is completed.

6. The method of claim 1, wherein the first data snapshot on the source and the second data snapshot on the target are taken at different times, but the data snapshots contain identical data on both the source and on the target.

7. The method of claim 1, wherein the first data snapshot on the source and the second data snapshot on the target are generated independent of how fast the second data snapshot on the target is replicated.

8. The method of claim 1, wherein the first data snapshot on the source and the second data snapshot on the target are generated at a rate determined by how fast data on the target is replicated.

9. The method of claim 1, further comprising performing pending I/O operations ahead of the token at the target before generating the second data snapshot on the target, and performing further I/O operations at the target again after generating the second data snapshot.

10. The method of claim 1, wherein the I/O operations resuming once the first data snapshot is generated includes both operation of the application and iSCSI target.

11. The method of claim 1, further comprising an iSCSI initiator informing the iSCSI target when the application is quiesced.

12. The method of claim 1, further comprising signaling generation of the first data snapshot at the source to an event handler via a WMI event.

13. The method of claim 1, further comprising generating the second data snapshot without quiescing I/O operations at the target.

14. A data snapshot replication system for use in computer storage, the data snapshot replication system comprising:
    a source storage device;
    an application server;
    a target storage device; and
    a replication link:
    wherein, the source storage device is connected via the replication link to the target storage device, the application server quiescing Input/Output (I/O) operations from an application through to an iSCSI target, while a first data snapshot is generated at the source storage device, the I/O operations resuming once the first data snapshot is generated, the replication link receiving a token when the first data snapshot is generated at the source storage device, the token initiating generation of a second data snapshot on the target storage device.

15. The system of claim 14, wherein the replication link is first-in-first-out (FIFO) to ensure equivalence of the first and second data snapshots at both the source and the target.

16. The system of claim 14, wherein the first data snapshot generated at the source storage device indicates a state of the source storage device when the token is inserted into the replication link.

* * * * *

UNITED STATES PATENT AND TRADEMARK OFFICE
CERTIFICATE OF CORRECTION

PATENT NO. : 8,489,831 B2  
APPLICATION NO. : 12/243193  
DATED : July 16, 2013  
INVENTOR(S) : Robert D. Thompson et al.

Page 1 of 1

It is certified that error appears in the above-identified patent and that said Letters Patent is hereby corrected as shown below:

In the Specification

In column 4, line 15, delete "to "snap event")" and insert -- (a "snap event") --, therefor.

In column 6, line 21, delete "(where" and insert -- (when --, therefor.

In the Claims

In column 8, line 31, in Claim 14, delete "link:" and insert -- link; --, therefor.

Signed and Sealed this  
Twenty-sixth Day of November, 2013

Margaret A. Focarino  
*Commissioner for Patents of the United States Patent and Trademark Office*